US012494136B2

(12) United States Patent
Ortlieb

(10) Patent No.: US 12,494,136 B2
(45) Date of Patent: Dec. 9, 2025

(54) METHOD AND SYSTEM FOR OPERATING AN AIRCRAFT

(71) Applicant: Volocopter GmbH, Bruchsal (DE)

(72) Inventor: Markus Ortlieb, Karlsruhe (DE)

(73) Assignee: Volocopter GmbH, Bruchsal (DE)

( * ) Notice: Subject to any disclaimer, the term of this patent is extended or adjusted under 35 U.S.C. 154(b) by 179 days.

(21) Appl. No.: 18/307,962

(22) Filed: Apr. 27, 2023

(65) Prior Publication Data

US 2023/0351904 A1  Nov. 2, 2023

(30) Foreign Application Priority Data

Apr. 28, 2022 (DE) .......................... 102022110344.7

(51) Int. Cl.
```
G08G 5/55     (2025.01)
G08G 5/21     (2025.01)
G08G 5/22     (2025.01)
G08G 5/57     (2025.01)
```
(52) U.S. Cl.
CPC ................. G08G 5/55 (2025.01); G08G 5/21 (2025.01); G08G 5/22 (2025.01); G08G 5/57 (2025.01)

(58) Field of Classification Search
CPC .. G08G 5/0069; G08G 5/0021; G08G 5/0026; G08G 5/0034; G08G 5/0052; G08G 5/045; G05D 1/1064; B64D 45/00; B64U 2101/30; B64U 2201/10; B64U 2201/20
USPC ............... 701/3, 12; 244/76 R, 195; 340/963
See application file for complete search history.

(56) References Cited

U.S. PATENT DOCUMENTS

```
6,334,344  B1 *  1/2002  Bonhoure ............ G05D 1/101
2005/0273223  A1   12/2005  Artini et al.
2013/0261850  A1   10/2013  Smith et al.
2015/0192926  A1 *  7/2015  Kozlow  ............. G05D 1/0202
2017/0193827  A1 *  7/2017  Dill ....................... G08G 5/006
2018/0164801  A1 *  6/2018  Kim ..................... G08G 5/0013
```
(Continued)

FOREIGN PATENT DOCUMENTS

```
DE      102019103173      8/2020
WO      2017147142        8/2017
```

OTHER PUBLICATIONS

R. V. Gilabert, E. T. Dill, K. J. Hayhurst and S. D. Young, "Safeguard: Progress and test results for a reliable independent on-board safety net for UAS," 2017 IEEE/AIAA 36th Digital Avionics Systems Conference (DASC), St. Petersburg, FL, USA, 2017, pp. 1-9, doi: 10.1109/DASC.2017.8102087. (Year: 2017).*

(Continued)

*Primary Examiner* — Ramon A. Mercado
*Assistant Examiner* — Ellis B. Ramirez
(74) *Attorney, Agent, or Firm* — FIG. 1 Patents

(57) ABSTRACT

A method for operating an aircraft (1) is provided, wherein for a predetermined trajectory (NT) of the aircraft (1) a volume enveloping the trajectory (NT) is determined, which volume includes a first, inner volume and a second, outer volume, and the second volume envelops the first volume. The first volume is composed of a plurality of first individual volumes (TVi) and the second volume is composed of a number of second individual volumes, which individual volumes (TVi) are calculated at each point of the trajectory (NT) on the basis of parameters ($v_i$) of an actual flight condition of the aircraft (1) at a respective time.

17 Claims, 3 Drawing Sheets

(56) References Cited

U.S. PATENT DOCUMENTS

| | | | |
|---|---|---|---|
| 2019/0033862 A1* | 1/2019 | Groden | G05D 1/0088 |
| 2020/0327814 A1* | 10/2020 | Adolf | B64C 29/0025 |
| 2021/0034078 A1* | 2/2021 | Gomez Gutierrez | G05D 1/1064 |
| 2022/0108619 A1 | 4/2022 | Mangeruca et al. | |
| 2022/0111962 A1 | 4/2022 | Ortlieb | |

OTHER PUBLICATIONS

E. T. Dill, S. D. Young and K. J. Hayhurst, "Safeguard: An assured safety net technology for UAS," 2016 IEEE/AIAA 35th Digital Avionics Systems Conference (DASC), Sacramento, CA, USA, 2016, pp. 1-10, doi: 10.1109/DASC.2016.7778009. (Year: 2016).*

* cited by examiner

METHOD AND SYSTEM FOR OPERATING AN AIRCRAFT

CROSS-REFERENCE TO RELATED APPLICATIONS

This application claims priority from German Patent Application No. 10 2022 110 344.7, filed Apr. 28, 2022, which is incorporated herein by reference as if fully set forth.

TECHNICAL FIELD

The invention relates to a method for operating an aircraft, a system for operating an aircraft and, a suitably equipped aircraft.

BACKGROUND

In Europe, boundaries of the airspace cleared for a mission are defined for the operation of aircraft, especially so-called UAVs (unmanned aerial vehicles), using quantitative calculation methods. These methods use purely static, i.e. fixed, volumes, which are calculated on the basis of conservative assumptions. The entire scope of the mission must remain within predetermined volumes, even if the mission gets out of control.

For a flight controlled by a human pilot, so-called "tunnels in the sky" can be used to make it easier for the human pilot to fly a predefined trajectory or flight path, for example for precision approaches. These "tunnels in the sky" are shown to the pilot together with a relative position of the aircraft in relation to a reference trajectory on a suitable display.

Classic "geocaging" includes the restriction of flight operations to an authorized geographical "volume", i.e. a specific (airspace) region, the so-called "geocage"; the operation of a UAV is therefore limited to missions within this region. A specific trajectory, which is flown within the flight region, is only included in the consideration if there is a risk of violating the external boundaries of the region. However, for missions in complex environments (for example cities, mountains, archipelagos, etc.) or in a controlled airspace, it is often practically impossible to define larger contiguous operating areas within which a UAV can move freely. Instead, a pre-approved trajectory (target trajectory) must be flown as precisely as possible or deviations from the planned trajectory must be reacted to in a timely manner. Deviations from the target trajectory that are larger than expected can then lead to certain sections of a trajectory no longer being flown or certain take-off/landing sites (so-called Vertiports) no longer being approachable.

SUMMARY

It is therefore necessary to specify a method and a system for operating an aircraft with which the freest possible flight movement can be achieved, especially by UAVs, but also by manned aircraft, even in difficult or complex flight environments.

The invention achieves this object by a method according, a system, and an aircraft each having one or more of the features disclosed herein.

Advantageous developments are defined in the description and the claims that follow.

According to the invention, a method for operating an aircraft provides that for a predetermined trajectory or flight path of the aircraft, a volume enveloping the trajectory is determined, which volume comprises a first, inner volume and a second, outer volume, wherein the second volume envelops the first volume, preferably in each imaginary plane of 3D space perpendicular to the trajectory, wherein the first volume is composed of a plurality of first individual volumes and the second volume is composed of a number of second individual volumes, which individual volumes are calculated at each point of the trajectory on the basis of parameters of an actual flight condition of the aircraft at a respective time.

In this way, it is possible to define metrics for the trajectory following quality, to implement this on the basis of physical flight parameters and to monitor this continuously, so that the freest possible flight movement can be achieved even in difficult or complex flight environments. This possibility exists regardless of whether the operation of the aircraft is manned or unmanned.

According to the second aspect of the invention, this creates a system for operating an aircraft with a geocaging module, which according to the invention acts as a volume determination module located on board the aircraft or on the ground, wherein in the second case the volume determination module is connected to the aircraft via a data link, which volume determination module is designed and provided to determine the volumes required to carry out the method according to the invention on the basis of a nominal trajectory, i.e. a pre-planned trajectory, and which for this purpose receives as input data at least a current position, a current speed and a current heading, i.e. the direction of flight of the aircraft.

An aircraft according to the invention is characterized in that it is equipped with a system according to the invention for operating the aircraft.

For each trajectory, a geocage is calculated in the form of the aforementioned volume, wherein the geocage is calculated from a so-called flight geography (first volume) and a so-called contingency volume (second volume), and the geocage is based on a respective nominal flight condition along the mentioned trajectory. In the case of trajectories planned online, the geocage is preferably calculated at the time of flight, in the case of trajectories planned before departure, the geocage can also be calculated before the start of the mission.

The geocage comprises first sub or individual volumes, which describe the nominal trajectory following quality of the aircraft, as well as second sub volumes, within which sub volumes so-called corrective or contingency measures can or must be carried out in order to correct a current trajectory of the aircraft back towards the planned trajectory.

The calculation of the mentioned volumes is based on parameters of the actual flight condition, such as preferably a (planned) speed, altitude, trajectory angle or other factors (for example weather conditions).

In a further embodiment of the invention, the direction of flight of the UAV can also be taken into account. As a result, volumes are no longer scaled in an undirected manner. Boundaries of the geocage which lie in the direction of flight can thus be classified more critically than those boundaries that are parallel or opposite to the direction of flight, for example. In this way, the extent of the flight geography and the contingency volume can be greater in the direction of flight than opposite to the direction of flight or in the lateral direction.

During the flight, it is preferable to check whether the aircraft is still within the geocage around the nominal or reference trajectory. If the aircraft exits the flight geography (first volume), countermeasures are preferably initiated to save the mission. If, on the other hand, the aircraft exits the contingency volume (second volume), the mission is preferably aborted and immediate measures, such as an immediate safety landing, are most preferably initiated in order to protect people and/or material.

A distinction is preferably made between two forms of operation: in a manned operation, the flight geography and contingency volume are shown to the pilot in a pilot display (for example a head-up display (HUD)) as an extension of a "tunnel-in-the-sky". In the case of violation of the flight geography, for example, the pilot is requested (visually and/or audibly) to return to the actual trajectory; in addition, the USSP (U-Space Service Provider) is preferably informed. In case of violation of the contingency volume, it is preferable to make an immediate safety landing. In this context, this means that the mission will be aborted and a landing will be carried out at the nearest alternative landing site. It can also be a priority of the aircraft for so-called deconflicting measures to be increased (for example, similar to for the purpose of avoiding and resolving conflicts between the trajectories of multiple air transport participants in the event of a radio failure during the landing approach).

If, on the other hand, there is unmanned operation and the aircraft is flying in the contingency volume, so-called recovery maneuvers (which lead the aircraft back to the flight geography) can be triggered automatically or the takeover of control by a remote pilot sitting at a flight control center, for example, can be requested. The operator and the airspace surveillance agency will preferably also be informed. Further measures or the takeover of control by the remote pilot (if not already done, see above) are initiated if the contingency volume is exited.

Potentially, in addition or alternatively, a change in the control strategy (for example a fallback to a more robust and/or low-performance controller) or a switch to routes with lower navigation performance requirements can be carried out so that the aircraft can continue its mission as far as possible.

The implementation of the mentioned volumes enables continuous and traceable monitoring of the tracking performance, which can also be visually displayed to a pilot. The tracking performance or trajectory following performance describes how precisely the aircraft can follow a given path. This is usually determined by the navigation error (i.e. the inaccuracy of determining the own position) and the aeronautical error (i.e. the inaccuracy with which a controller or pilot follows a target trajectory). This trajectory following performance must be monitored to determine whether it is within an expected range of values or whether countermeasures need to be initiated.

Furthermore, flight corridors result within which an aircraft is actually very likely to be present during nominal operation, in contrast to conservatively estimated regions, which are largely of no practical relevance. In particular, this information can also be used to plan multiple routes in the same airspace and to optimize airspace utilization.

This can be implemented by means of a so-called geocaging module, which can be implemented on board the aircraft as well as executed as part of a ground control station. In the latter case, communication with the aircraft preferably takes place via a critical data link.

In the following, particular advantageous embodiments of the invention are explicitly referred to again:

A development of the method according to the invention provides that the parameters include at least one of the following influencing variables: planned speed of the aircraft, flight altitude, trajectory angle, weather conditions, in particular wind strength and wind direction, worst-case behavior of the aircraft in the event of loss of control and feasibility of a recovery maneuver at the respective time. As a result, the (individual) volumes mentioned can be adapted as well as possible to a particular situation and do not have to be designed to be excessively large owing to conservative estimates.

The calculation of the volumes to be monitored preferably takes into account the planned speed. The current speed, on the other hand, is used for subsequent monitoring of the volumes calculated on the basis of the target trajectory.

The trajectory angle (also the angle of climb) describes the angle of the trajectory relative to a tangential plane which is generated at the perpendicular point of the trajectory on the reference ellipsoid of the earth. The trajectory angle therefore describes how steeply the aircraft climbs or descends.

Another development of the method according to the invention provides that the individual volumes are calculated taking into account the flight direction of the aircraft. In this way, the volumes do not have to be scaled in an undirected manner, which has already been pointed out in detail above.

In order to enable the most flexible trajectory planning possible, another development of the method according to the invention provides that the individual volumes are calculated at flight time.

Alternatively, however, a design is also possible in which the individual volumes are calculated before the start of a mission of the aircraft. In this way, in particular, the requirements for hardware on board the aircraft can be reduced.

In order to be able to react as quickly as possible to external circumstances, another development of the method according to the invention provides that during a flight it is continuously checked whether the aircraft is within the volume, in particular within the first volume.

Advantageously, with an appropriate development of the method according to the invention, it is provided that recovery maneuvers are initiated if the aircraft exits the first volume; and/or that if the aircraft exits the second volume a current mission is aborted and immediate measures, such as an immediate safety landing, are initiated. In this way, catastrophic events can be avoided and people or materials can be protected.

It has already been pointed out that within the framework of the method according to the invention, two possible cases are distinguished: in the case of manned operation of the aircraft, the first volume and the second volume can be graphically shown to a pilot on board the aircraft in a display, in particular in a head-up display, wherein preferably when the aircraft exits the first volume the pilot is optically (visually) and/or audibly requested to return to the (nominal) trajectory, and preferably a responsible U-space service provider is informed.

On the other hand, in the case of unmanned operation of the aircraft, recovery maneuvers can be triggered automatically and/or a remote pilot can take over control of the aircraft when the first volume is exited, wherein preferably an operator of the aircraft and a responsible airspace surveillance agency are also automatically informed. Furthermore, on exiting the second volume it is highly preferable that further measures can be initiated or that the remote pilot takes over control if this has not already been done. This has already been pointed out above.

In the case of a suitable development of the invention according to the invention, an additional or alternative measure exists in the form of a change in a control strategy of the aircraft, in particular a switch to a more robust, low-performance controller, and/or a switch to a trajectory with lower requirements on the navigation performance of the aircraft. This, too, has already been pointed out above.

In the case of a development of the system according to the invention, it may also be provided that the volume determination module is designed to compare a respective geometry of the determined volumes with received navigation data of the aircraft and to command remedial measures, i.e. to issue suitable control commands, especially in the event of a violation of the first volume.

BRIEF DESCRIPTION OF THE DRAWINGS

Further properties and advantages of the invention result from the following description of exemplary embodiments based on the drawing.

DETAILED DESCRIPTION

Figure 1:
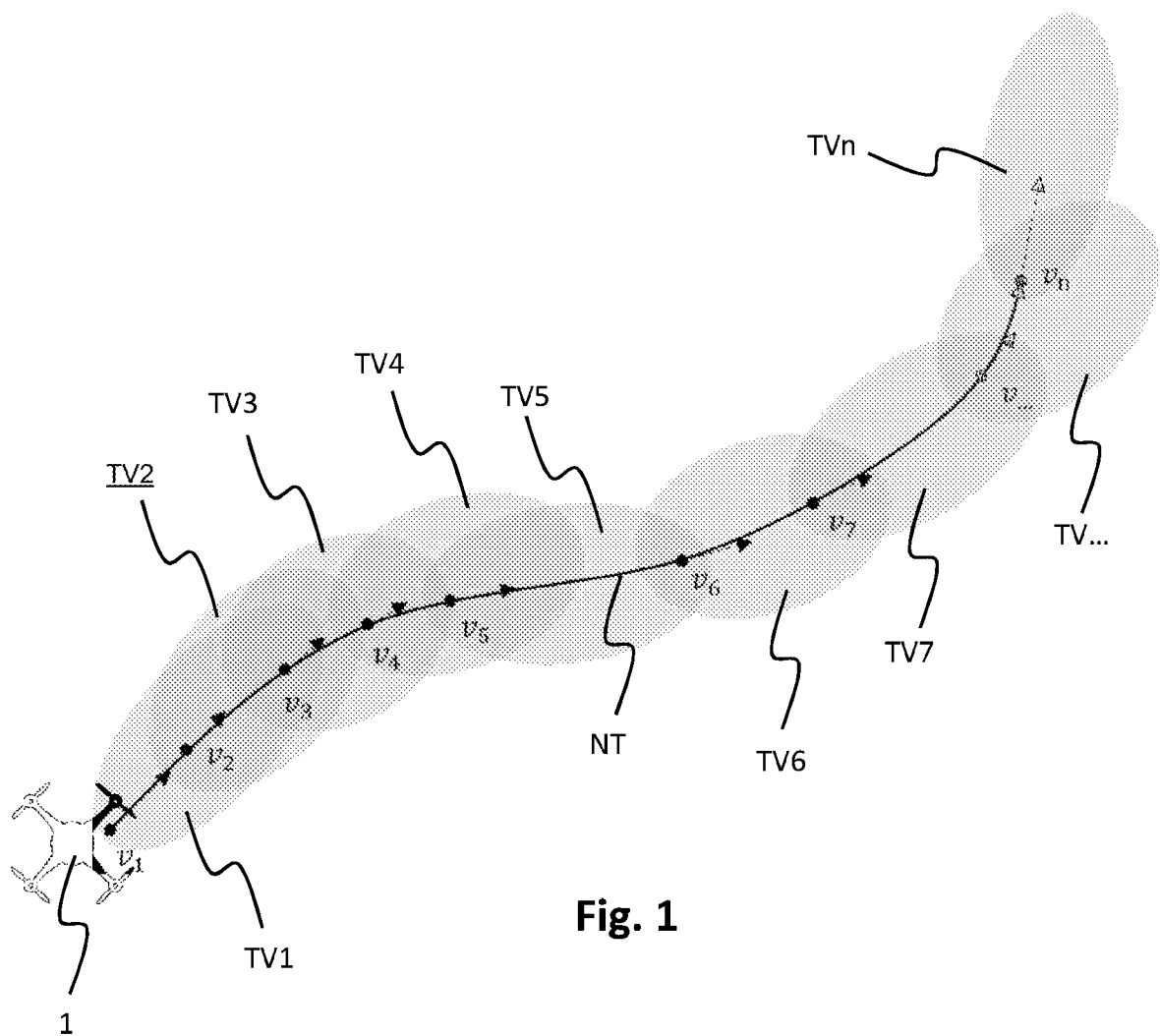
FIG. 1 shows an aircraft with a nominal trajectory and several first individual volumes.

FIG. 1 shows an (unmanned) aircraft 1 (UAV), which aircraft 1 is moving along a (nominal) trajectory NT. Certain points are marked along the trajectory NT, and at each of these points an instantaneous speed of the aircraft 1 along the trajectory NT is given vectorially ($v_i$, i=1 . . . n). The speed represents a possible physical influencing variable or a possible parameter of an actual flight condition of the aircraft 1 at a respective point in time, which is taken into account in the context of the method according to the invention.

For the trajectory NT, volumes are defined which indicate the expected trajectory deviation of the aircraft 1 during nominal operation, i.e. its deviation from the trajectory NT. These (single) volumes are given in FIG. 1 for each of the mentioned points in time by a corresponding ellipse TVi. Together, these volumes TVi result in a first volume that envelops the trajectories NT and is also referred to as a "flight geography". In addition, a so-called contingency volume (second volume) is defined, which envelops the first volume (not shown in FIG. 1; cf. FIG. 2). The contingency volume refers to a region within which the aircraft 1 can be brought under control and/or returned to the planned trajectory NT. According to the invention, the calculation of these volumes is made dependent on the actual flight condition of the aircraft 1 and other influencing factors, which was pointed out in detail above. The speed given in FIG. 1 is only a specific example of such an influencing factor.

For each actual state of the aircraft 1 along the planned trajectory NT, the geocage is derived by means of analytical models. Preferably, as already mentioned, these models take into account, among other things, the current speed of the aircraft 1 $v_i$, an assumed worst-case behavior of the aircraft 1 in the event of loss of control and the feasibility of a recovery maneuver at the respective time. During the flight, it is preferable to continuously check whether the position of the aircraft 1 violates these limits, i.e. the boundaries of the geocage.

Figure 2:
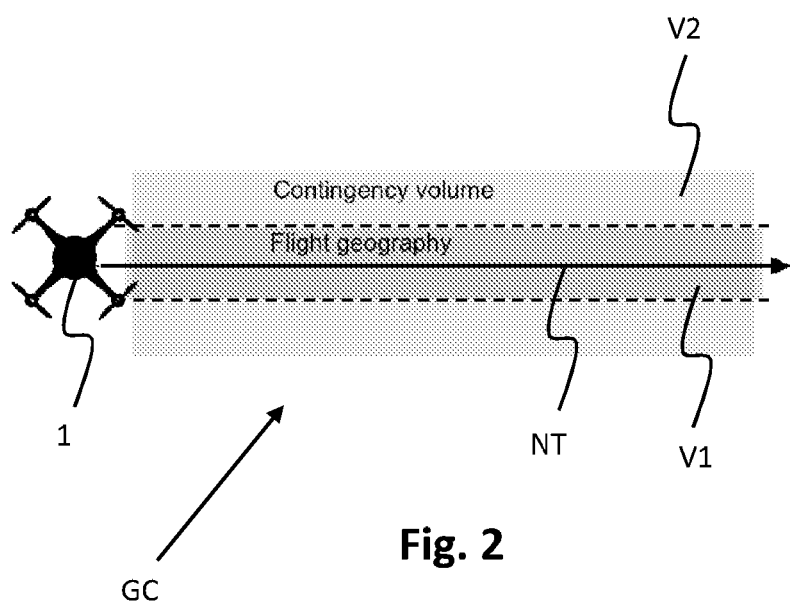
FIG. 2 shows a trajectory with the first and second volumes enveloping it.

FIG. 2 shows a resulting complete geocage GC in a simplified representation, which consists of a first volume ("Flight Geography"; see FIG. 1) V1 enveloping the trajectory NT and a second volume ("Contingency Volume") V2 enveloping the first volume V1. The flight geography (volume V1) of a trajectory NT is calculated as the envelope of the flight geography determined at each state point, in particular with speed $v_i$ (compare the individual volumes TVi in FIG. 1). The calculation of the contingency volume (volume V2) is carried out analogously from corresponding individual volumes and leads to the trajectory NT shown in simplified form in FIG. 2, which trajectory NT is surrounded by the respective flight regions (volumes V1, V2).

Although this is only shown in two dimensions in FIG. 2 for the sake of simplicity, the calculation of the geocage GC can preferably also be three-dimensional, so that a "tunnel" is created around the nominal trajectory NT, within which the aircraft 1 must remain.

Figure 3:
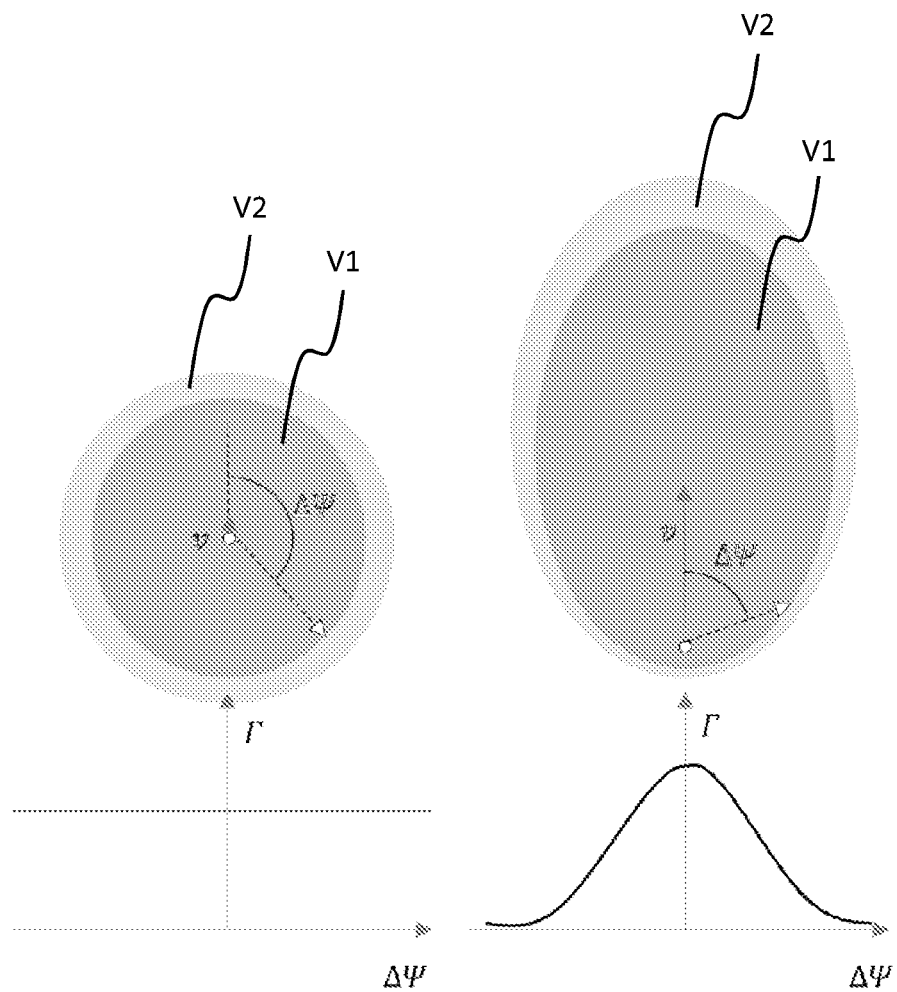
FIG. 3 shows different ways of scaling a geocage.

FIG. 3, left, shows a direction-independent implementation of a region scale for the first volume (V1, inside) and the second volume (V2, outside) with unidirectional weighting heuristics Γ. Such an embodiment is particularly suitable for low instantaneous speeds v of the aircraft (not shown). An expansion of the first volume or the second volume does not depend on an angle $\Delta\Psi$ in relation to an instantaneous direction of flight of the aircraft.

The right side of FIG. 3 shows an embodiment with direction-weighted geocage zones (first volume V1 or second volume V2) and corresponding weighting heuristics Γ. An extension of the volumes mentioned is significantly greater for small angles $\Delta\Psi$ in relation to an instantaneous flight direction of the aircraft than for large angles $\Delta\Psi$. Such an embodiment is particularly suitable for higher instantaneous speeds v of the aircraft (not shown).

While the first version also takes into account a scaling of the geocage in directions that are not relevant from a physical point of view or are only relevant with a very low probability, a second version of the system takes the direction of flight into account when evaluating the permissible flight regions. The approach is based on the assumption that the probability of a deviation from the nominal trajectory in a certain direction decreases with increasing angular difference $\Delta\Psi$ to the current direction of flight (corresponding to the vector v).

Figure 4:
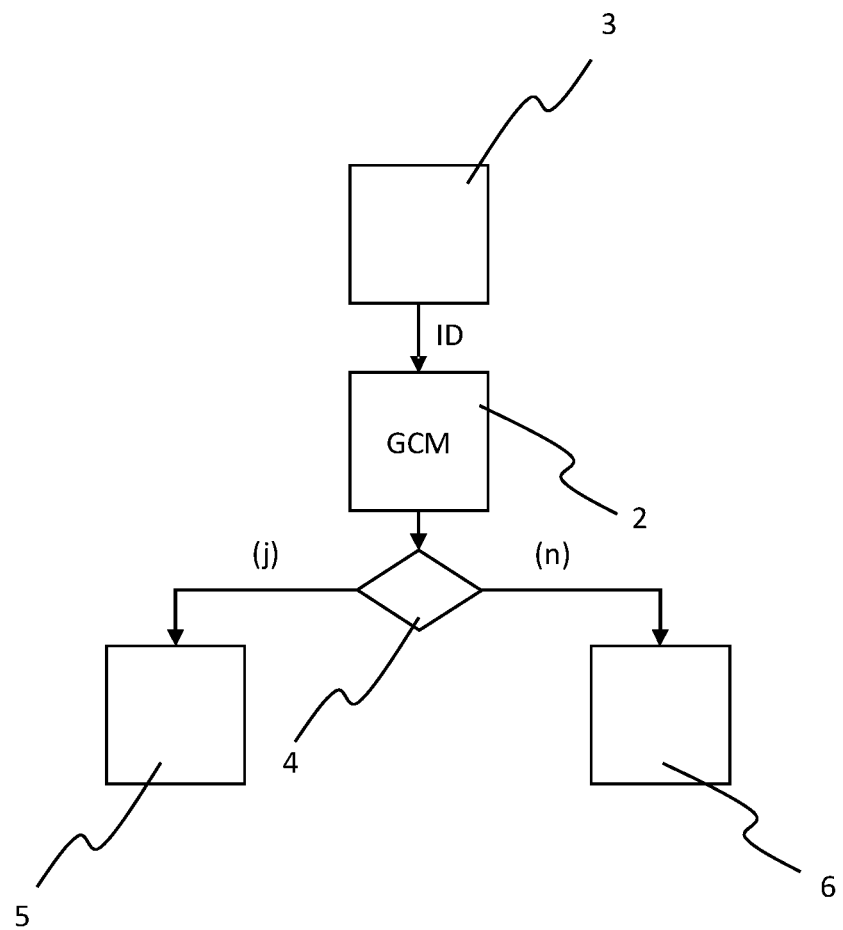
FIG. 4 shows a possible design embodiment of the system according to the invention.

The described method can be implemented by means of a suitably designed geocaging module, as shown in FIG. 4 as an example. The geocaging module (GCM) 2 having a controller that interacts by signaling with a navigation system 3 for the aircraft (not shown in FIG. 4); the geocaging module 2 preferably receives the current position, the current speed and a current heading of the aircraft as input data ID from the navigation system 3. Within the geocaging module 2, the geometry of the geocage is calculated on the basis of the nominal trajectory (which is assumed to be known) (see FIGS. 1 to 3 above) and compared with the received navigation data. The geocaging module 2 thus functions in particular as a volume determination module, which is designed and provided to determine the volumes required to carry out the method according to the invention on the basis of the nominal trajectory, and for this purpose preferably receives at least the aforementioned input data. In the event of a violation of a flight region (the aircraft exits the relevant region boundaries), the GCM 2 commands in particular appropriate contingency measures or arranges for a mission to be aborted.

Depending on the respective mode of operation (manned/unmanned), the invention corresponding to FIG. 4 includes the representation of the geocage on a pilot display or a function for performing recovery maneuvers in the flight control system. For example, in step 4, a query is made as to whether the unmanned operating mode is active. If this query is answered in the affirmative (j), the function for performing recovery maneuvers in the flight guidance system is activated at reference sign 5. Otherwise (n), at reference sign 6 the geocage is shown on the pilot display, for example a head-up display (HUD).

The geocaging module 2 does not need to be installed on board an aircraft but can also be part of a ground station that communicates with an aircraft via a suitable connection.

The invention claimed is:

1. A method for operating an aircraft, the method comprising:
   for a predetermined trajectory of the aircraft, determining, by a controller of the aircraft, a volume enveloping the predetermined trajectory, with the volume comprising a first, inner volume and a second, outer volume, wherein the second volume envelops the first volume, and the first volume is composed of a plurality of first individual volumes and the second volume is composed of a number of second individual volumes;
   calculating, by the controller, the first individual volumes and the second individual volumes at each point of the predetermined trajectory based on parameters of an actual flight condition of the aircraft at a respective time, wherein respective extensions of each the first individual volumes and the second individual volumes are greater in an aircraft direction of flight than in an opposite direction of the flight;
   when an unmanned operating mode of the aircraft is not active, signaling, by the controller, a head-up display of the aircraft that shows the first individual volumes and the second individual volumes; and
   when the unmanned operating mode of the aircraft is active, activating, by the controller, a function in a flight guidance system that performs recovery maneuvers based on the first individual volumes and the second individual volumes.

2. The method as claimed in claim 1, wherein the parameters include at least one of: a planned speed of the aircraft, a flight altitude, a trajectory angle, weather conditions, worst-case behavior of the aircraft in an event of loss of control and feasibility of a recovery maneuver at a respective time.

3. The method as claimed in claim 1, further comprising calculating the first and the second individual volumes taking into account a direction of flight of the aircraft.

4. The method as claimed in claim 1, further comprising calculating the first and the second individual volumes at a time of flight.

5. The method as claimed in claim 1, further comprising calculating the first and the second individual volumes before a start of a mission of the aircraft.

6. The method as claimed in claim 1, further comprising continuously checking during a flight whether the aircraft is within the volume.

7. The method as claimed in claim 1, further comprising initiating recovery maneuvers upon determining that the aircraft has exited the first volume.

8. The method as claimed in claim 1, further comprising aborting a current mission if the aircraft is found to have exited the second volume, and initiating further measures.

9. The method as claimed in claim 1, wherein in case of a manned operation of the aircraft, the method further comprises graphically displaying the first volume and the second volume to a pilot on board the aircraft in a display.

10. The method as claimed in claim 9, if the first volume is exited by the aircraft, the method further comprises at least one of visually or audibly requesting a pilot return to the predetermined trajectory.

11. The method as claimed in claim 1, wherein, in case of an unmanned operation of the aircraft, the method further comprises at least one of automatically triggering recovery maneuvers or requesting a remote pilot control takeover of the aircraft if the first volume is exited.

12. The method as claimed in claim 11, further comprising automatically notifying an operator of the aircraft and a responsible airspace surveillance agency.

13. The method as claimed in claim 1, further comprising carrying out a change of a control strategy of the aircraft including at least one of switching to a more robust, low-performance controller, or switching to a trajectory with lower requirements on a navigation performance of the aircraft.

14. A system for operating an aircraft, the system comprising a head-up display and a controller including a volume determination module located on board the aircraft or on the ground and connected to the aircraft via a data link, said volume determination module is configured to:
   for a predetermined trajectory of the aircraft, determine a volume enveloping the predetermined trajectory, with the volume comprising a first, inner volume and a second, outer volume, wherein the second volume envelops the first volume, and the first volume is composed of a plurality of first individual volumes and the second volume is composed of a number of second individual volumes;
   calculate the first individual volumes and the second individual volumes at each point of the predetermined trajectory based on parameters of an actual flight condition of the aircraft at a respective time, wherein respective extensions of each the first individual volumes and the second individual volumes are greater in an aircraft direction of flight than in an opposite direction of the flight;
   when an unmanned operating mode of the aircraft is not active, cause the head-up display to show the first individual volumes and the second individual volumes on the head-up display; and
   when the unmanned operating mode of the aircraft is active, activate a function in a flight guidance system that performs recovery maneuvers based on the first individual volumes and the second individual volumes.

15. The system as claimed in claim 14, wherein the volume determination module is further configured to:
   compare a respective geometry of the determined volumes with received navigation data of the aircraft; and
   command the flight guidance system to execute remedial measures in an event of a violation of at least one of the first volume or the second volume.

16. An aircraft comprising:
   a flight guidance system configured to cause flight maneuvers based on control commands;
   a head-up display; and
   a controller configured to command the flight guidance system by:
      for a predetermined trajectory of the aircraft, determining a volume enveloping the predetermined trajectory, with the volume comprising a first, inner volume and a second, outer volume, wherein the second volume envelops the first volume, and the first volume is composed of a plurality of first individual volumes and the second volume is composed of a number of second individual volumes;

calculating the first individual volumes and the second individual volumes at each point of the predetermined trajectory based on parameters of an actual flight condition of the aircraft at a respective time, wherein respective extensions of each the first individual volumes and the second individual volumes are greater in an aircraft direction of flight than in an opposite direction of the flight;

when an unmanned operating mode of the aircraft is not active, cause the head-up display of the aircraft to show the first individual volumes and the second individual volumes on the head-up display; and when the unmanned operating mode of the aircraft is active, activating a function in the flight guidance system that causes recovery flight maneuvers based on the first individual volumes and the second individual volumes.

17. The aircraft as claimed in claim 16, wherein when the first volume is exited by the aircraft, the controller is further configured to cause the head-up display of the aircraft to at least one of visually or audibly request a pilot return to the predetermined trajectory.

* * * * *